(12) United States Patent
Qin et al.

(10) Patent No.: US 7,959,238 B2
(45) Date of Patent: Jun. 14, 2011

(54) ANTI-LOCK BRAKING SYSTEM

(75) Inventors: Rui Feng Qin, Hong Kong (CN); Ting Tuan Xu, Shenzhen (CN); Fei Liu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 12/778,557

(22) Filed: May 12, 2010

(65) Prior Publication Data

US 2010/0289326 A1    Nov. 18, 2010

(30) Foreign Application Priority Data

May 12, 2009   (CN) .......................... 2009 1 0107312

(51) Int. Cl.
 *B60T 8/40*   (2006.01)
(52) U.S. Cl. .................................... 303/116.4; 310/179
(58) Field of Classification Search ............... 303/116.4, 303/119.2, 119.3; 417/440; 310/89, 90, 310/179, 180, 198
See application file for complete search history.

(56) References Cited

U.S. PATENT DOCUMENTS

| | | | | |
|---|---|---|---|---|
| 5,801,467 | A | * | 9/1998 | Volz et al. ........................ 310/89 |
| 5,895,207 | A | * | 4/1999 | Burgdorf et al. ............ 417/410.1 |
| 7,239,060 | B2 | * | 7/2007 | Cros et al. ..................... 310/198 |
| 7,703,862 | B2 | * | 4/2010 | Abe et al. ................... 303/119.3 |
| 2005/0147512 | A1 | * | 7/2005 | Chen et al. ............... 417/423.12 |
| 2009/0058210 | A1 | * | 3/2009 | Qin et al. ...................... 310/179 |
| 2009/0142208 | A1 | * | 6/2009 | Rhein et al. ................ 417/410.3 |

* cited by examiner

*Primary Examiner* — Christopher P Schwartz
(74) *Attorney, Agent, or Firm* — Muncy, Geissler, Olds & Lowe, PLLC

(57) ABSTRACT

The motor of an anti-lock braking system comprises a stator having six stator poles and a rotor with a rotor core having nine teeth. The rotor is rotatably mounted to the stator with the rotor core confronting the stator poles. Rotor windings are wound about the teeth and electrically connect to a commutator fixed to a rotor shaft. A bearing is fixed onto one end of the rotor shaft. Pump pistons radially attach to the bearing. The mechanical centreline of the bearing is offset from the rotational axis of the rotor shaft so that the pistons are driven by the bearing when the rotor turns. The windings comprise a plurality of concentrated coils so that the coils do not overlap with each other. The axial length of the motor is thus reduced.

11 Claims, 5 Drawing Sheets

ANTI-LOCK BRAKING SYSTEM

CROSS REFERENCE TO RELATED APPLICATIONS

This non-provisional patent application claims priority under 35 U.S.C. §119(a) from Patent Application No. 200910107312.1 filed in The People's Republic of China on May 12, 2009.

FIELD OF THE INVENTION

This invention relates to anti-lock braking systems for vehicles and to electric motors for use in anti-lock braking systems.

BACKGROUND OF THE INVENTION

An anti-lock braking system (hereafter called ABS) is one of the important parts of a vehicle. FIG. 5 illustrates a hydraulic anti-lock braking system. The anti-lock braking system comprises a number of wheels 10, a plurality of wheel sensors 20, an electrical control unit (ECU) 30, a motor pump assembly 40 and a hydraulic system 50. The hydraulic system is used to control braking of the wheels. The wheel sensors 20 detect rotation of the wheels. The ECU 30 generates a control signal based on the detection results provided by the wheel sensors 20. The control signal is used to control the motor pump assembly 40 and valve of the hydraulic system 50 to unlock the wheels when a skidding situation is determined.

The motor pump assembly 40 comprises a motor and a pump. The motor comprises a rotatable output shaft. A bearing is fixed onto one end of the output shaft. The rotational axis of the output shaft is offset from a mechanical centerline of the bearing. For example, the output shaft is a concentric shaft, and the bearing is an eccentric bearing. The pump comprises two pistons. Each of the pistons is attached to the bearing in a substantially radial direction. The two pistons are driven by the bearing when the bearing rotates with the output shaft. Permanent magnet direct current (hereafter called PMDC) motors are widely used in anti-lock braking systems. A traditional PMDC motor comprises a stator having four stator poles (hereafter called poles) and a rotor having a rotor core with thirteen rotor poles or teeth (hereafter called slots). Windings of the rotor comprise a plurality of coils. Each coil is wound about three of four teeth (coil pitch is equals to 3 or 4). The coils overlap at both axial ends of the rotor core, resulting in a motor with a large axial length.

It is desired to develop a motor with a shorter axial length but with a substantially equivalent performance.

SUMMARY OF THE INVENTION

According to one aspect of the present invention, an anti-lock braking system is provided. The anti-lock braking system comprises a motor pump assembly comprising a motor and a pump, wheel sensors for detecting rotation of the wheels and generating a rotation signal, and an electrical control unit for controlling the motor pump assembly based on the rotation signal; wherein the motor comprises a stator and a rotor, the stator comprising six poles formed by permanent magnets; the rotor comprising a rotor shaft, a rotor core fixed to the rotor shaft and having nine teeth, a commutator fixed to the rotor shaft adjacent the rotor core, and windings wound about the teeth and electrically connected to segments of the commutator; and wherein a bearing is fixed onto one end of the rotor shaft, the pump comprising at least one piston attached to the bearing, a mechanical centerline of the bearing being offset from the rotational axis of the rotor shaft so that the piston is driven by the bearing when the rotor shaft rotates.

Preferably, the windings comprise a plurality of concentrated coils, each of the coils being wound about a single corresponding tooth and electrically connected to a pair of corresponding segments.

Preferably, the commutator comprises eighteen segments, and the windings comprise nine pairs of concentrated coils, each pair of coils comprises two coils that are wound about the same tooth, leads of each pair of coils being electrically connected to four corresponding segments.

Preferably, the commutator comprises six equalizers, each of the equalizers electrically connecting together three equally spaced commutator segments.

According to another aspect of the present invention, a motor used for driving a pump of an anti-lock braking system is provided. The motor comprises a stator and a rotor rotatably mounted to the stator; the stator comprising a housing and permanent magnets fixed to an inner surface of the housing; the rotor comprising a rotor shaft and a bearing fixed onto one end of the rotor shaft; the mechanical centreline of the bearing being offset from the rotational axis of the rotor shaft, so that a pump piston attached to the bearing is driven by the bearing when the rotor shaft rotates, wherein the stator comprises six stator poles formed by the magnets, the rotor comprises a rotor core fixed to the rotor shaft and having nine teeth, a commutator fixed the rotor shaft adjacent the rotor core, and windings wound about the teeth and electrically connected to segments of the commutator.

Preferably, the bearing is an eccentric bearing, and the rotor shaft is a concentric shaft.

Alternatively, the bearing is a concentric bearing, and the rotor shaft comprises an eccentric portion forming a seat for the concentric bearing.

Preferably, the commutator comprises a plurality of segments, the windings comprise a plurality of concentrated coils, each of the coils being wound about a respective one of the teeth and electrically connected to a pair of segments.

Preferably, the commutator comprises eighteen segments, and the windings comprise nine pairs of concentrated coils, each pair of coils comprising two coils that are wound about the same tooth, and leads of each pair of coils being electrically connected to four corresponding segments.

Preferably, in each pair of coils, one coil is wound in a clockwise direction and the other one is wound in a counter clockwise direction.

Preferably, the rotor comprises six equalizers, each of the equalizers electrically connecting together three equally spaced commutator segments.

Compared to a traditional motor with four stator poles and thirteen rotor teeth, the motor according to preferred embodiments of the present invention comprising six stator poles and nine rotor teeth has a higher power density, and a more compact structure.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 5:
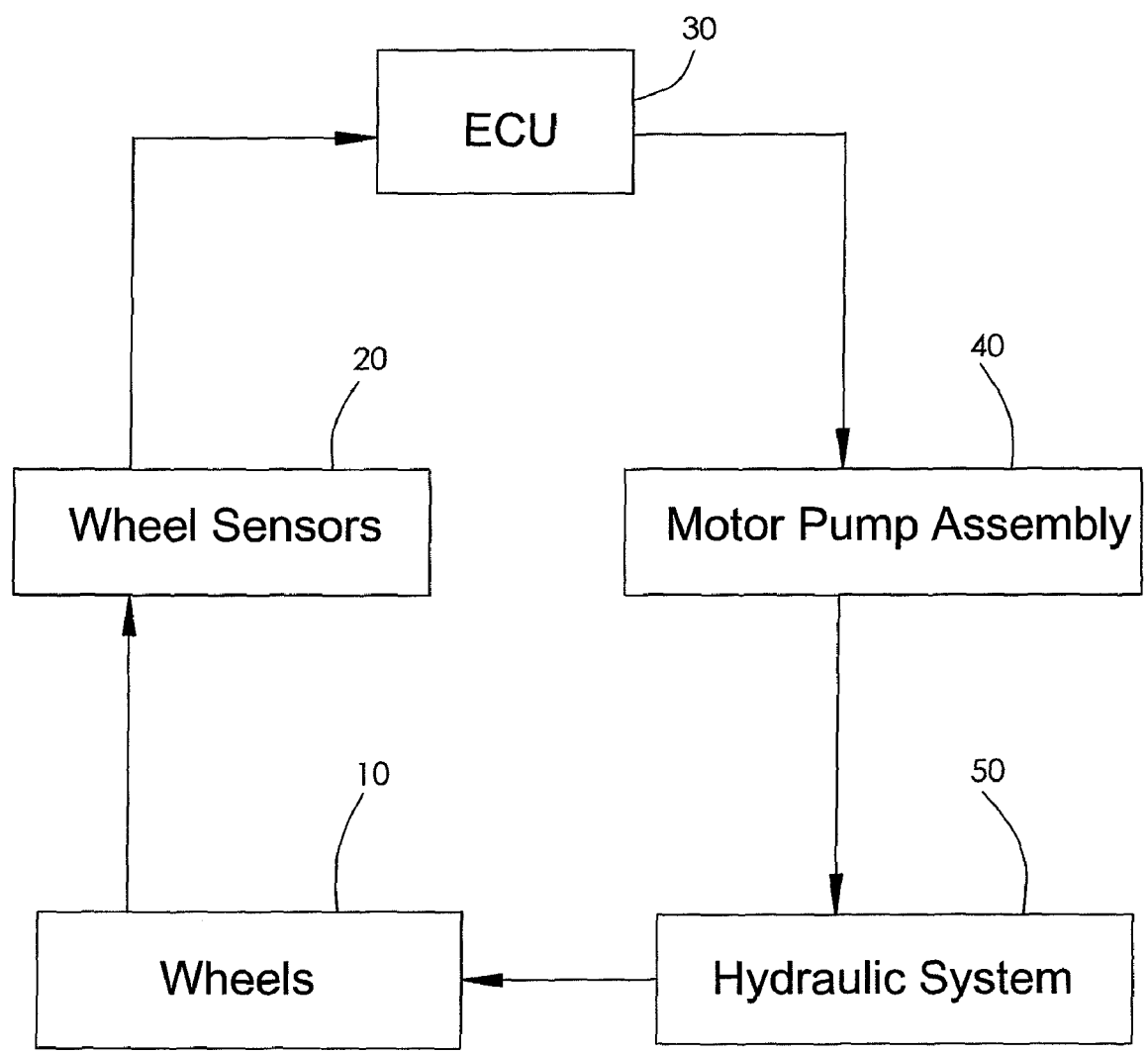
FIG. 5 illustrates elements of a hydraulic anti-lock braking system.

An anti-lock braking system according to one preferred embodiment of the present invention will be described with reference to FIG. 5 of the accompanying drawings. The anti-lock braking system comprises wheel sensors 20, an ECU 30, a motor pump assembly 40 and a hydraulic system 50. The wheel sensors 20 detect rotation of the wheels 10 of the vehicle, and send a rotation signal (the detection result) to the ECU 30. The ECU 30 generates a control signal based on the rotation signal. The motor pump assembly 40 and the hydraulic system 50 are controlled based on the control signal. Specifically, the motor of the motor pump assembly, and the valves of the hydraulic system are controlled based on the control signal. In particular, when the wheel sensors detect that a skidding situation exists, the motor is operated to drive the pump to cause pulsations in the hydraulic system to allow the wheels to regain grip on the road surface.

The motor pump assembly 40 comprises a motor and a pump. The motor comprises a rotatable output shaft such as rotor shaft. A bearing is fixed to one end of the output shaft. Mechanical centerline of the bearing is offset from the rotational axis of the output shaft. The pump comprises two pistons which are attached to the bearing in a substantially radial direction. The two pistons are driven by the bearing when the bearing rotates with the output shaft. The pistons are driven by the eccentric movement of the bearing.

Figure 1:
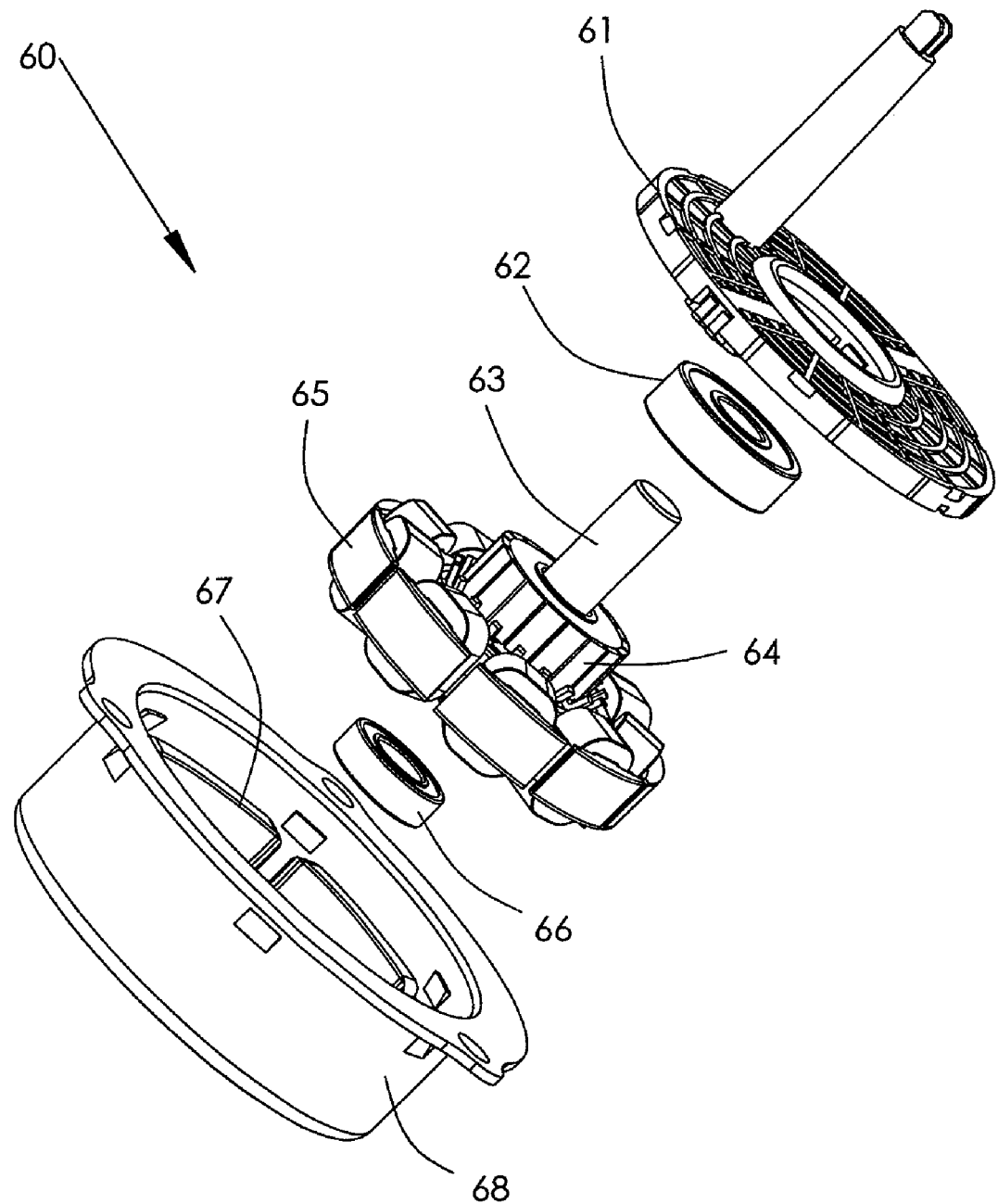
FIG. 1 is an exploded view of a PMDC motor of an anti-lock braking system according to one embodiment of the present invention.
Figure 2:
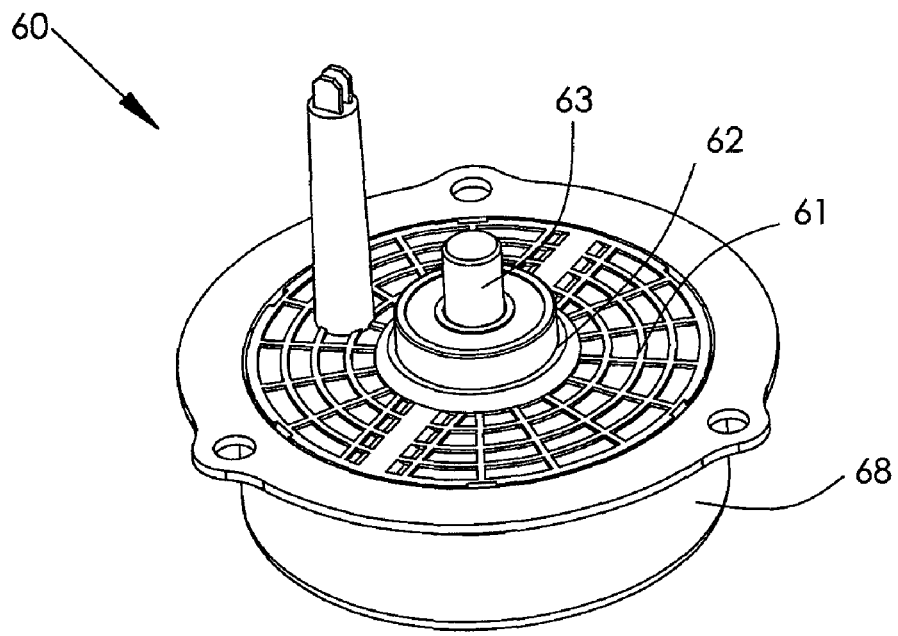
FIG. 2 is a perspective view of the motor of FIG. 1.
Figure 3:
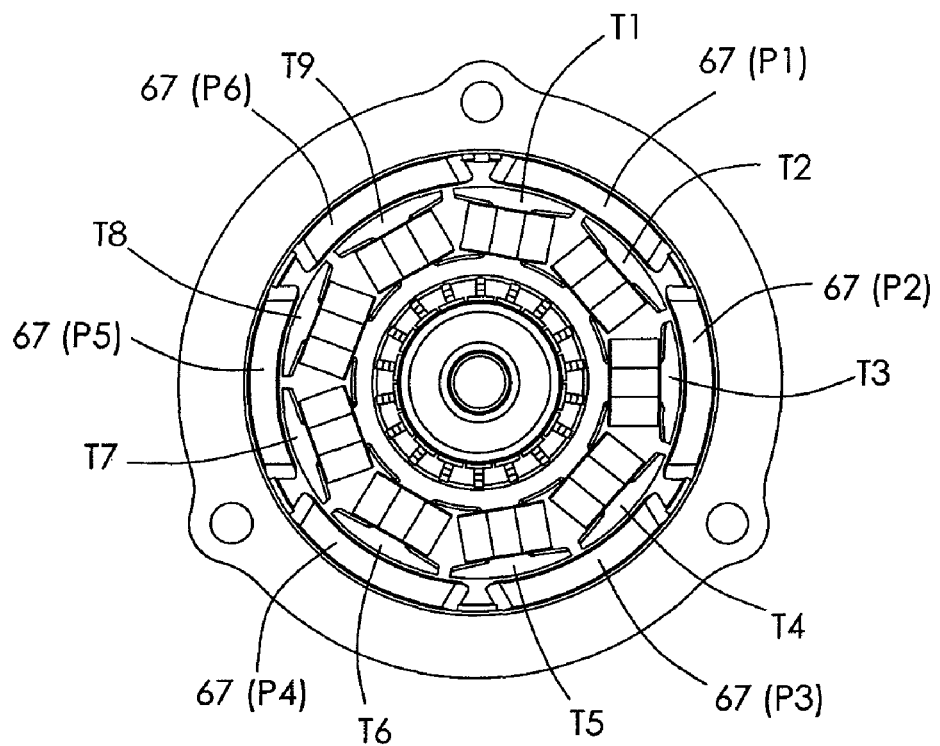
FIG. 3 illustrates the inner structure of the motor of FIG. 1.

As shown in FIGS. 1 to 3, the motor according to the preferred embodiment of the present invention comprises a stator and a rotor. The stator comprises a housing 68, permanent magnets 67 fixed to an inner surface of the housing, and an end cap 61 fixed to the housing. There are six magnets forming six stator poles (P1-P6), including three north poles (hereafter called N pole) and three south poles (hereafter called S poles). The N poles and the S poles are arrayed alternately, circumferentially about the inner surface of the housing. The rotor comprises a rotor shaft 63, a rotor core 65 fixed onto the rotor shaft, a commutator 64 fixed onto the shaft adjacent to the rotor core, and windings wound about nine teeth (T1-T9) of the rotor core 65 and electrically connect to segments of the commutator. The rotor is rotatably mounted to the stator with the rotor shaft 63 rotatably supported by two bearings 62 and 66, which are disposed at respective ends of the stator. A winding slot is formed between adjacent teeth. The windings comprise a plurality of concentrated coils, each of which is wound about a single tooth and electrically connected to a pair of commutator segments. By use of concentrated windings, the coils do not overlap with each other at the axial ends of the rotor core. Therefore, the axial length of the rotor is reduced.

Figure 6:
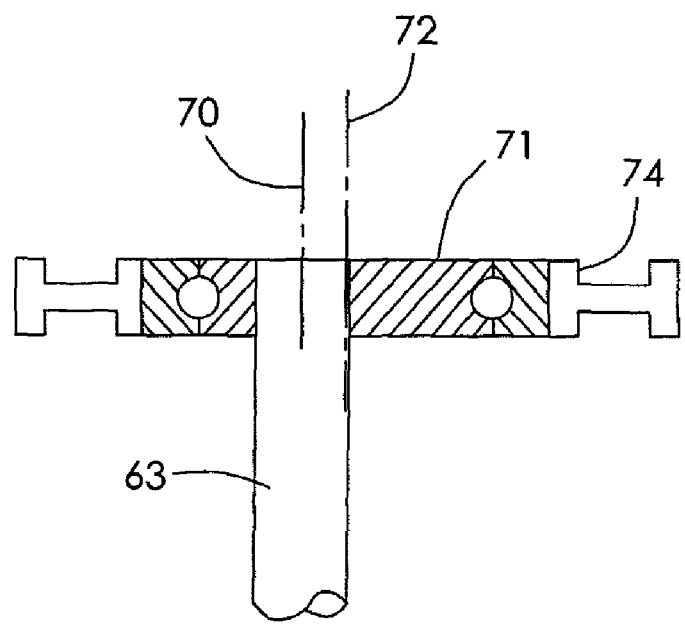
FIG. 6 illustrates a preferred eccentric connection between an output shaft of the motor and pistons of the pump.
Figure 7:
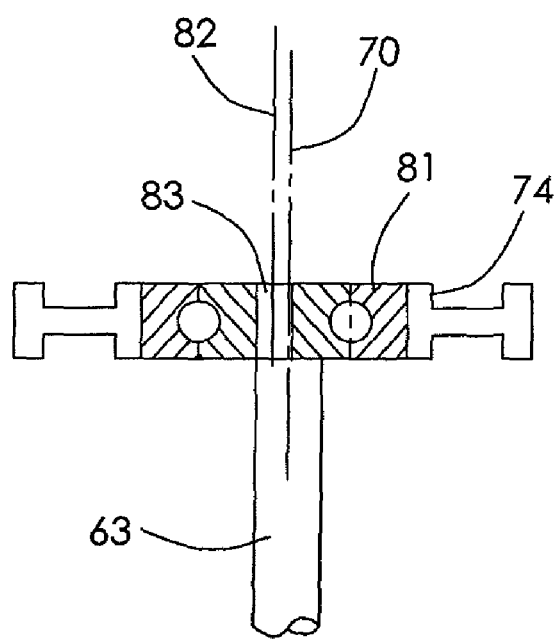
FIG. 7 illustrates an alternative eccentric connection.

In the preferred embodiment, the rotor shaft 63 is the output shaft of the motor and the output shaft is a concentric shaft. An eccentric bearing 71, as shown in FIG. 6, is fixed onto the output shaft 63. The mechanical centerline 72 of the eccentric bearing is offset from the rotational axis 70 of the output shaft 63. The pump comprises two pistons 74, each of which radially attaches to the eccentric bearing. When the rotor shaft 63 rotates, the rotary motion is converted into linear reciprocating motion of the pistons by means of the eccentric bearing 71. In an alternative embodiment, as shown in FIG. 7, the rotor shaft 63 has an eccentric portion 83 where the bearing 81 is fixed. In this case the bearing 81 is a concentric bearing and the eccentric portion 83 causes the rotary motion of the shaft to induce reciprocating motion in the pistons 74.

Figure 4:
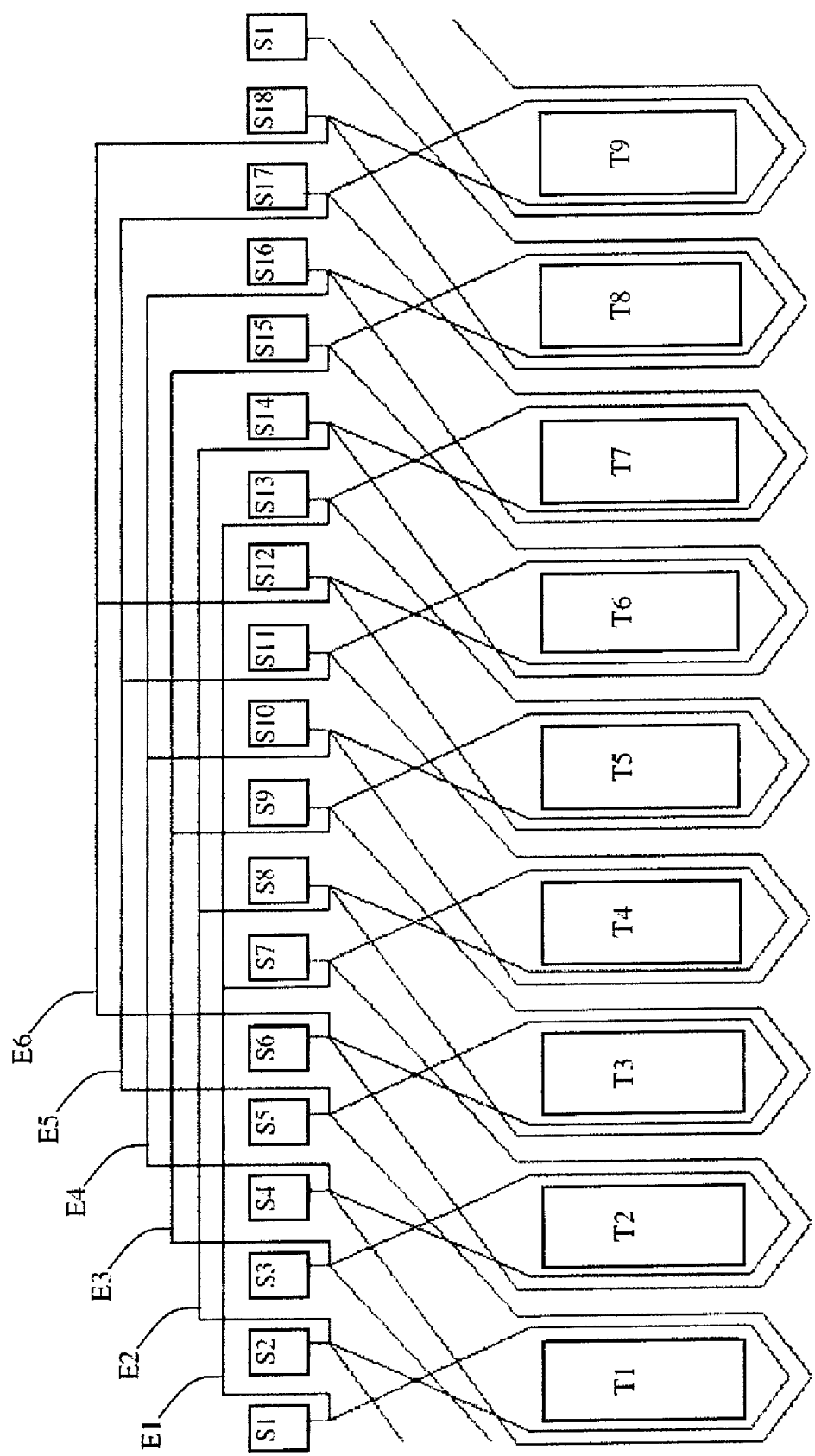
FIG. 4 is a winding diagram showing the winding arrangement of the motor of FIG. 1.

FIG. 4 is a winding diagram illustrating how the rotor is wound. From FIG. 4 we can see that the commutator 64 comprises eighteen segments S1~S18. The number of segments is twice the number of teeth. The eighteen segments are arrayed along a circumferential direction of the commutator. The windings comprise nine pairs of coils. Each pair of coils comprises two concentrated coils that are wound about the same tooth. Terminals or leads of each pair of coils are electrically connected to four commutator segments. Preferably, the four segments are arrayed one by one. Preferably, the four segments are located near the corresponding tooth to keep the leads of the pair of coils short. In the preferred embodiment, in each pair of coils, one coil is wound in a clockwise direction and the other coil is wound in a counter clockwise direction.

In FIG. 4 the blocks T1~T9 represent the nine teeth, the blocks S1~S18 represent the eighteen segments, and lines E1~E6 represent six equalizers. Each equalizer electrically connects together three equally spaced commutator segments, thereby allowing the motor to operate as a six pole motor with three pairs of brushes whereas it actually has only one pair of brushes. Each coil is wound about a single tooth, and has two leads electrically connected to two commutator segments. The eighteen concentrated coils are arranged as nine pairs of coils. Each pair of coils is wound about one corresponding tooth. Each pair of coils are connected to four segments which are located near to the corresponding tooth.

As is mentioned, the stator comprises three N poles and three S poles. Therefore, at any time there are three segments located at identical pole positions. For example, segment S1, S7 and S13 are located at identical pole positions such as N pole. By use of the equalizers, every three segments located at identical pole positions are electrically connected together. Only a single pair of brushes is needed to feed current to the windings. Compared with a traditional motor which comprises six poles and six brushes, the motor according to the preferred embodiment is more compact and cheaper.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. An anti-lock braking system comprises a motor pump assembly comprising a motor and a pump, wheel sensors for detecting rotation of the wheels and generating a rotation signal, and an electrical control unit for controlling the motor pump assembly based on the rotation signal;

wherein the motor comprises a stator and a rotor, the stator comprising six poles formed by permanent magnets; the rotor comprising a rotor shaft, a rotor core fixed to the rotor shaft and having nine teeth, a commutator fixed to the rotor shaft adjacent to the rotor core, and windings wound about the teeth and electrically connected to segments of the commutator; and wherein a bearing is fixed onto one end of the rotor shaft, the pump comprising at least one piston attached to the bearing, a mechanical centerline of the bearing being offset from the rotational axis of the rotor shaft so that the piston is driven by the bearing when the rotor shaft rotates.

2. The anti-lock braking system of claim 1, wherein the windings comprise a plurality of concentrated coils, each of the coils being wound about a single corresponding tooth and electrically connected to a pair of corresponding segments.

3. The anti-lock braking system of claim 1, wherein the commutator comprises eighteen segments, and the windings comprise nine pairs of concentrated coils, each pair of coils comprises two coils that are wound about the same tooth, leads of each pair of coils being electrically connected to four corresponding segments.

4. The anti-lock braking system of claim 1, wherein the commutator comprises six equalizers, each of the equalizers electrically connecting together three equally spaced commutator segments.

5. A PMDC motor of an anti-lock braking system, the anti-lock braking system including said PMDC motor and a pump, wheel sensors for detecting rotation of the wheels and generating a rotation signal, and an electrical control unit for controlling the motor pump assembly based on the rotation signal, the motor comprising a stator and a rotor rotatably mounted to the stator; the stator comprising a housing and permanent magnets fixed to an inner surface of the housing; the rotor comprising a rotor shaft and a bearing fixed onto one end of the rotor shaft; the mechanical centreline of the bearing being offset from the rotational axis of the rotor shaft, so that a pump piston attached to the bearing is driven by the bearing when the rotor shaft rotates, wherein the stator comprises six stator poles formed by the magnets, the rotor comprises a rotor core fixed to the rotor shaft and having nine teeth, a commutator fixed the rotor shaft adjacent the rotor core, and windings wound about the teeth and electrically connected to segments of the commutator.

6. The motor of claim 5, wherein the bearing is an eccentric bearing, and the rotor shaft is a concentric shaft.

7. The motor of claim 5, wherein the bearing is a concentric bearing, and the rotor shaft comprises an eccentric portion forming a seat for the concentric bearing.

8. The motor of claim 5, wherein the commutator comprises a plurality of segments, the windings comprise a plurality of concentrated coils, each of the coils being wound about a respective one of the teeth and electrically connected to a pair of segments.

9. The motor of claim 5, wherein the commutator comprises eighteen segments, and the windings comprise nine pairs of concentrated coils, each pair of coils comprising two coils that are wound about the same tooth, and leads of each pair of coils being electrically connected to four corresponding segments.

10. The motor of claim 9, wherein in each pair of coils, one coil is wound in a clockwise direction and the other one is wound in a counter clockwise direction.

11. The motor of claim 5, wherein the rotor comprises six equalizers, each of the equalizers electrically connecting together three equally spaced commutator segments.

\* \* \* \* \*